Sept. 20, 1966     C. D. BRADLEY     3,273,470
HYDRAULIC LOAD CELL
Filed May 4, 1964
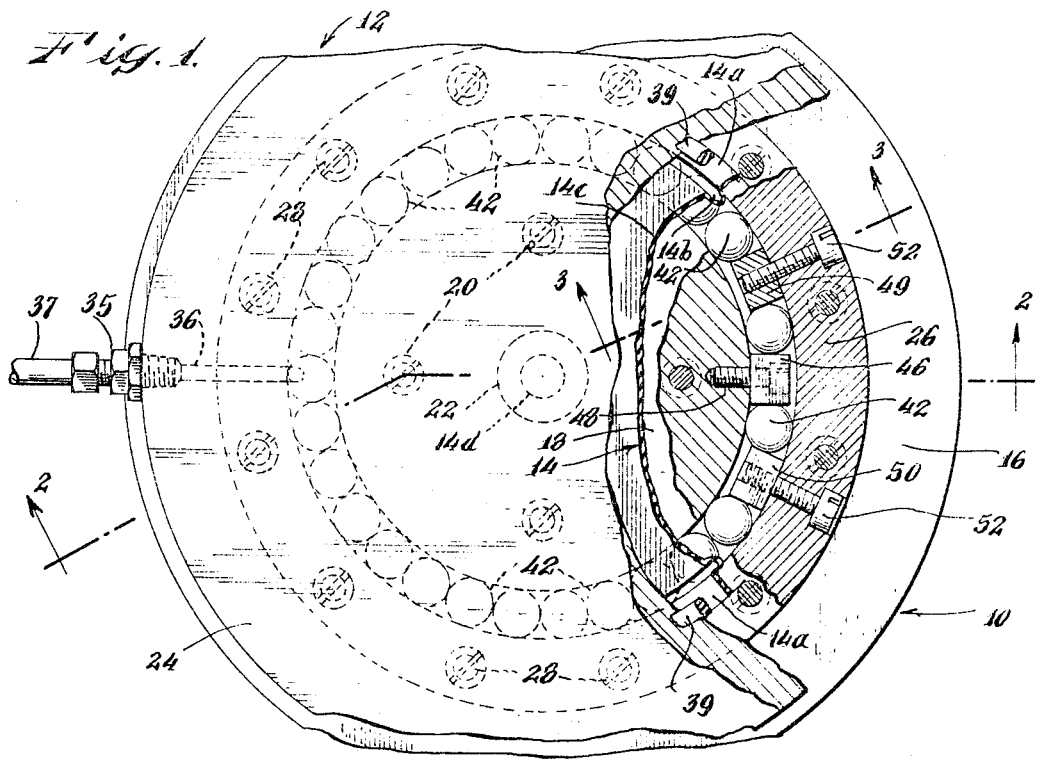
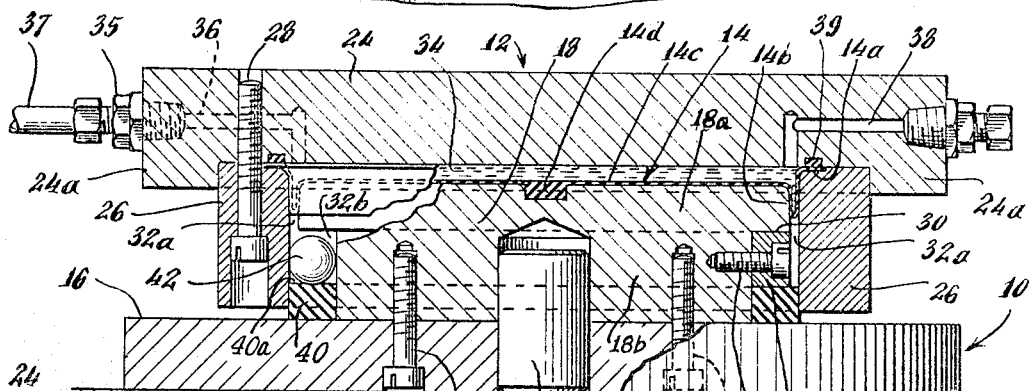
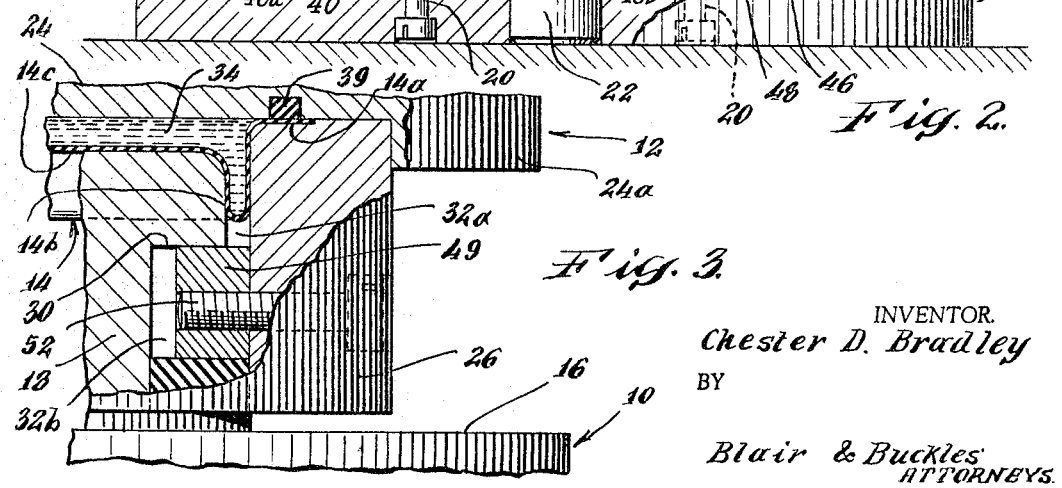
INVENTOR.
Chester D. Bradley
BY
Blair & Buckles
ATTORNEYS.

United States Patent Office 3,273,470
Patented Sept. 20, 1966

3,273,470
HYDRAULIC LOAD CELL
Chester D. Bradley, Darien, Conn., assignor to The
A. H. Emery Company, New Canaan, Conn.
Filed May 4, 1964, Ser. No. 364,499
6 Claims. (Cl. 92—101)

This invention relates to load cells and more particularly to an improved hydraulic load cell of the type wherein the load signal is generated in response to relative telescopic movement of coacting piston and cylinder members.

Piston and cylinder type load cells, while particularly well suited for the measurement of large loads, are inherently subject to binding of the piston and cylinder members in the presence of large cross loads. Cross loads are virtually unavoidable in most weighing applications. For example, cross loads occur because of inherent expansion or contraction of the large containers customarily placed on the load cell to receive the matter to be weighed, or because of wind acting on the load. Since the resulting binding of the cell seriously impairs its accuracy, it is important that provision be made to eliminate or at least minimize such binding.

Several arrangements have been devised to cope with this problem. One such arrangement is shown in my United States Patent No. 2,960,113. In the load cell of that patent, three vertical grooves provided at locations spaced uniformly around the periphery of the piston are circumferentially aligned with three vertical grooves in the facing surface of the cylinder to define a plurality of vertical races. A single ball is disposed in each race and each ball is yieldably positioned in its race by upper and lower springs. The balls thus provide a substantially frictionless bearing surface for the relative vertical movement of the piston and cylinder and are yieldably movable in their races to allow the cylinder to tilt relative to the piston. Such tilting allows the loading surface of the cell to tilt, relative to the base surface supporting the cell, to an angle conforming to the slope of the surface of the structure whose weight is being sensed.

Load cells constructed in accordance with this arrangement have proven very satisfactory under normal loading conditions. Such load cells are relatively expensive to manufacture, however, because of the expensive machining operations required to provide the required plurality of vertical races. Furthermore, the ability of the cell to satisfactorily handle lateral loads is limited by the fact that any such load is carried by, at most, two balls.

Accordingly, it is an object of the present invention to provide an improve load cell of the piston and cylinder type.

It is a further object to provide such a load cell whose operation and accuracy will not be adversely affected by side loads.

A further object is to provide such a load cell which may be manufactured at a lower cost than known load cells of this type.

Another object is to provide such a load cell which will operate effectively even when subjected to extremely large side loads.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIGURE 1 is a top view of a load cell according to the invention, portions of the upper members of the cell being broken away to show details of internal construction;

FIGURE 2 is a cross sectional view taken on line 2—2 of FIGURE 1; and

FIGURE 3 is a fragmentary cross sectional view taken on line 3—3 of FIGURE 1.

The load cell of the invention is of the piston and cylinder type. An annular space is provided between the piston and cylinder and a plurality of balls are arranged, ball to ball, in the annular space around the piston in a single closed circumferential row. The balls thus rollably engage the adjacent cylindrical walls of the piston and cylinder to provide a substantially frictionless bearing surface for the relative telescopic movement of the piston and cylinder. The balls also allow the cylinder to tilt relative to the piston.

A ring member surrounds the piston and presents an annular horizontal support surface underlying the annular space between the piston and cylinder. The balls are supported on the ring which is formed of a resilient material so that it yields downwardly upon collapsing telescopic movement of the piston and cylinder to allow the balls to roll rather than skid on the facing cylindrical walls of the piston and cylinder.

In the preferred embodiment of the invention, the load cell is of the hydraulic type. It includes a relatively thin flexible diaphragm of fluid impervious material sealed to the cylinder and extending over the free end of the piston to form a fluid pressure chamber between the cylinder and the free end of the piston. Separate members, rigid with the piston and cylinder, respectively, project radially therefrom into the annular space between the piston and cylinder between adjacent balls. These members thus coact with the balls to resist relative rotation between the piston and cylinder and thereby prevent rupture of the diaphragm.

Referring now to the drawing, and first to FIGURE 2, the load cell of the invention, broadly considered, comprises a base structure shown generally at 10, a load receiving structure or head shown generally at 12, and a flexible diaphragm 14.

Base structure 10 includes a horizontal base plate 16, and a piston member 18 centrally upstanding from the base plate and secured thereto by bolts 20 passing upwardly through counterbored holes in the base plate 16 for threaded engagement with blind bores in the lower face of the piston member. Base plate 16 and piston member 18 are also joined by a centering pin 22 passing upwardly with a force fit through a central aperture in the base plate into a central blind bore in the lower face of the piston member. Piston member is stepped at 30 to provide an upper portion 18a and a smaller diameter lower portion 18b (see also FIG. 3).

Load head 12 includes a horizontal loading plate 24 and a cylindrical skirt 26. Skirt 26 is clamped up against the undersurface of plate 24 by a circumferentially spaced (FIG. 1) series of bolts 28 passing upwardly through counterbored holes in skirt 26 for threaded engagement with bores in the loading plate 24. The skirt 26 is centered within a rim portion 24a on the lower face of plate 24.

In the assembled relation of load head 12 and base structure 10, skirt 26 telescopically receives piston member 18. A narrow annular space 32a is defined between skirt 26 and upper piston portion 18a and a wider annular space 32b is defined between skirt 26 and lower piston portion 18b (see also FIG. 3).

Diaphragm 14 is preferably formed of a fluid impervious pliable plastic material. It includes an outer substantially plane flanged portion 14a (see also FIG.

3) clamped by bolts 28 between the upper edge face of skirt 26 and the lower face of loading plate 24, an annular loop portion 14b received in annular space 32a, and a circular central portion 14c overlying the upper or free end of the piston member 18 and centered relative thereto by a button portion 14d received in a central blind bore in the upper end of the piston member. Diaphragm 14 thus forms with the under surface of plate 24 a pressure chamber 34 for receipt of a suitable hydraulic fluid.

A passage 36 in loading plate 24 communicates at one end with the pressure chamber 34 and at its other end with a fitting 35 for connection to a pressure line 37 to a suitable pressure gage or indicator (not shown). The diaphragm 14 thus functions in known manner to generate a load signal in the trapped hydraulic fluid in response to relative telescopic movement of the piston and skirt occurring upon imposition of a load on plate 24. This load signal is in turn read out by the gage or other indicator connected to the passage 36.

A second passage 38 in loading plate 24 communicates at one end with pressure chamber 34 and at its other end with the atmosphere to vent the pressure chamber. An O-ring 39 is provided to coact with flange portion 14a to prevent leakage of fluid out of chamber 34.

A ring member 40 of resilient material extends around the lower end of the small diameter portion 18b of the piston member. The outer cylindrical surface of ring member 40 sealingly engages the inner cylindrical wall of the lower end of skirt 26, and the upper surface of ring member 40 provides a horizontal annular support surface 40a underlying annular space 32b.

A plurality of stainless steel balls 42 are arranged ball to ball on support surface 40a in a single closed circumferential row extending around (FIG. 2) the piston member in annular space 32b. The diameter of the balls is approximately equal to the width of space 32b so that they rollably engage the adjacent cylindrical walls of skirt 26 and piston member 18.

When a load is applied to loading plate 24, load head 12 is moved downwardly to increase the pressure of the fluid in chamber 34 by an amount proportional to the load. The pressure of the fluid is sensed by the pressure gage to give a visual indication of the load magnitude.

As load head 12 moves downwardly under the load, balls 42 roll on the adjacent cylindrical walls of skirt 26 and piston member 18 to provide a substantially frictionless bearing surface for the relative telescopic movement of the load head and base structure. The rolling movement of balls 42 is made possible by the resilient construction of ring 40, which yields downwardly upon collapsing telescopic movement of the piston member and skirt to allow the balls to roll, rather than skid, on the adjacent cylindrical walls. It is to be understood that the amount of relative telescopic movement is only in the order of a few thousandths of an inch, even under severe loading.

The single row of balls 42 also allows the load head to tilt relative to the base structure. Thus, when the cell is placed between non parallel loading surfaces, the load head may tilt in a direction to align itself with the mating surface without restraint. Balls 42 must of course be free to move selectively vertically during such tilting movement to accommodate the varying vertical motion of the skirt. Such freedom of vertical movement is provided by the space normally present between the tops of balls 42 and the annular surface 30, as well as by the resiliency of ring 40. Ring 40 also provides, in coaction with the lower end of skirt 26, a seal to prevent the entry of dust or other contaminants into the ball chamber. Because of its resilience, however, ring member does not interfere with the tilting movement of the load head relative to the base structure.

As best seen in FIG. 1, a block 46 of steel or other rigid material is disposed in annular space 32b between adjacent balls 42. Block 46 is held rigid with the piston member 18 by a bolt 48 passing through a countersunk hole in the block and screwed into the piston member. Two other blocks, 49 and 50, are disposed in annular space 32b between adjacent balls and are held rigid with skirt 26 by bolts 52 passing through countersunk holes in the skirt and screwed into the blocks. Blocks 49 and 50 are disposed on either side of block 46, each separated therefrom by a single ball, so that the blocks and balls coact to positively prevent rotation of the load head relative to the base structure. This is important since such rotation might rupture diaphragm 14 and thereby render the cell completely inoperative.

It will be seen that the objects set forth above, among those made apparent from the preceding description, are efficiently attained. Specifically, the operation and accuracy of the load cell of the present invention, by virtue of the multiplicity of rolling guide balls provided between the piston and cylinder, is not adversely affected by side loads. Further, because of the simple manner in which these balls are positioned within the cell, the load cell of the invention may be relatively inexpensively manufactured. Further, because of the large number of balls carrying the side or thrust load at any given time, the load cell of the invention will operate effectively even when subjected to extremely large side loads.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

For example, although the load cell of the invention has been described above as being adapted for mounting on a horizontal base surface for measurement of gravity loads, it may be oriented in any position to measure loading forces applied in a direction normal to the load head.

It is also to be understood that the following claims are intended to cover all of the generic and specific features of the invention, herein described and all statements of the scope of the invention, which, as a matter of language, might be said to fall therebetween.

Having described my invention, what I claim as new and desire to secure by Letters Patent is:

1. A load cell comprising, in combination:
 (A) a base structure;
 (B) a load receiving structure providing a load receiving surface;
 (C) one of said structures including a piston portion and the other of said structures including a cylinder portion telescopically and coaxially receiving said piston portion with an annular space therebetween;
 (D) means operative to generate a load signal in response to relative axial telescopic movement of said cylinder and piston portions occurring upon imposition of a load on said load receiving surface;
 (E) means defining an annular support surface surrounding said piston portion and underlying said annular space;
 (F) a plurality of balls
    (a) arranged ball to ball on said support surface in a single closed circumferential row extending around said piston portion in said annular space; and
    (b) rollably engaging the adjacent cylindrical walls of said portions to guide them in their telescopic movement and allow relative tilting movement therebetween;
 (G) a member rigid with said cylinder portion and projecting radially inwardly from the cylindrical wall thereof into said annular space between two adjacent balls; and (H) a member rigid with said piston portion and projecting radially outwardly from the cylindrical surface thereof into said annular space between two adjacent balls, whereby said members form with the balls engaged thereby a link between said portions resisting relative rotation therebetween.

2. A load cell according to claim 1 wherein:
(a) there are two said members on one of said portions spaced by a single ball on either side of the said member on the other portion.

3. A load cell comprising, in combination:
(A) a base structure;
(B) a load receiving structure providing a load receiving surface;
(C) one of said structures including a piston portion and the other of said structures including a cylinder portion telescopically and coaxially receiving said piston portion with an annular space therebetween;
(D) a relatively thin flexible diaphragm of fluid impervious material sealed to said cylinder portion and extending over the free end of said piston portion to form a fluid pressure chamber between it and said load receiving structure;
(E) a fluid pressure passage leading from said pressure chamber to means for connection to an external pressure line;
(F) means defining an annular support surface surrounding said piston portion and underlying said annular space;
(G) a plurality of balls
  (1) arranged ball to ball on said support surface in a single closed circumferential row extending around said piston portion in said annular space, and
  (2) rollably engaging the adjacent cylindrical walls of said cylinder and piston portions to guide them in their telescopic movement and allow relative angular movement therebetween, and
(H) separate members rigid with said piston and cylinder portions, respectively, and projecting radially therefrom into said annular space between adjacent balls to resist relative rotation between said portions and thereby prevent rupture of said diaphragm.

4. A load cell comprising, in combination:
(A) a base structure including an upstanding piston portion;
(B) a load receiving structure including
  (1) an upper portion presenting a load receiving surface, and
  (2) a cylindrical skirt portion depending from said upper portion and telescopically and coaxially receiving said piston portion with an annular space therebetween;
(C) a relatively thin flexible diaphragm of fluid impervious material sealed to said cylinder portion and overlying said piston portion to form a fluid pressure chamber between it and said upper portion,
  (1) an annular fold of said diaphragm interlying an upper portion of said annular space;
(D) a ring surrounding said piston portion and presenting an annular support surface underlying said annular space; and
(E) a plurality of balls,
  (1) arranged ball to ball on said support surface in a single closed circumferential row extending around said piston portion in said annular space, and
  (2) rollably engaging the adjacent cylindrical walls of said portions to guide them in their telescopic movement and allow relative tilting movement therebetween;
(F) said cylindrical skirt extending downwardly beyond said annular space and sealingly engaging the outer peripheral surface of said ring member, whereby to prevent the entry of dust into said annular space;
(G) said ring member being formed of a resilient material so as to yieldably allow the aforedescribed relative tilting movement of said piston and cylinder portions and so as to yield downwardly upon collapsing telescopic movement of said portions to allow said balls to roll rather than skid on said cylindrical walls; and
(H) separate members rigid with said piston and said cylinder portions, respectively, and projecting radially therefrom into said annular space between adjacent balls to resist relative rotation between said portions and thereby prevent rupture of said diaphragm.

5. A load cell comprising, in combination:
(A) a base structure;
(B) a load receiving structure providing a load receiving surface;
(C) one of said structures including a piston portion and the other of said structures including a cylinder portion telescopically and coaxially receiving said piston portion with an annular space therebetween;
(D) means operative to generate a load signal in response to relative axial telescopic movement of said cylinder and piston portions occurring upon imposition of a load on said load receiving surface;
(E) means defining an annular support surface surrounding said piston portion and underlying said annular space;
(F) a plurality of balls
  (a) arranged ball to ball on said support surface in a single closed circumferential row extending around said piston portion in said annular space, and
  (b) rollably engaging the adjacent cylindrical walls of said portions to guide them in their telescopic movement;
(G) means for limiting relative rotation between said piston portion and said cylinder portion;
(H) said support surface defining means comprising a separate ring member extending around said piston portion and formed of a resilient material so as to yield downwardly upon collapsing telescopic movement of said portions to allow said balls to roll on said cylindrical walls; and
(I) said load receiving structure comprising an upper portion defining said load receiving surface and a cylindrical skirt depending from said upper portion to define said cylinder portion, and said skirt extending downwardly beyond said annular space and sealingly engaging the outer peripheral surface of said ring member, whereby to prevent the entry of dust into said annular space.

6. A load cell comprising, in combination:
(A) a base structure;
(B) a load receiving structure providing a load receiving surface;
(C) one of said structures including a piston portion and the other of said structures including a cylinder portion telescopically and coaxially receiving said piston portion with an annular space therebetween;
(D) a relatively thin flexible diaphragm of fluid impervious material sealed to said cylinder portion and extending over the free end of said piston portion to form a fluid pressure chamber between it and said load receiving structure;
(E) a fluid pressure passage leading from said pressure chamber to means for connection to an external pressure line;
(F) means defining an annular support surface surrounding said piston portion and underlying said annular space;
(G) a plurality of balls (1) arranged ball to ball on said support surface in a single closed circumferential row extending around said piston portion in said annular space, and
(2) rollably engaging the adjacent cylindrical walls of said cylinder and piston portions to guide them in their telescopic movement and allow relative angular movement therebetween; and
(H) said means defining an annular support surface sealing said cylinder portion with respect to said piston portion, whereby the said annular space is sealed while permitting said relative angular movement.

References Cited by the Examiner

UNITED STATES PATENTS

| | | | |
|---|---|---|---|
| 2,592,501 | 4/1952 | Williams | 177—208 X |
| 2,960,113 | 11/1960 | Bradley | 177—208 X |
| 2,973,641 | 3/1961 | Webster | 73—141 |

FOREIGN PATENTS 681,932  2/1930  France.

MARTIN P. SCHWADRON, *Primary Examiner.*

SAMUEL LEVINE, *Examiner.*

I. C. COHEN, *Assistant Examiner.*